No. 801,773. PATENTED OCT. 10, 1905.
G. DASEKING.
PROCESS OF REFINING MILK.
APPLICATION FILED MAY 14, 1903.
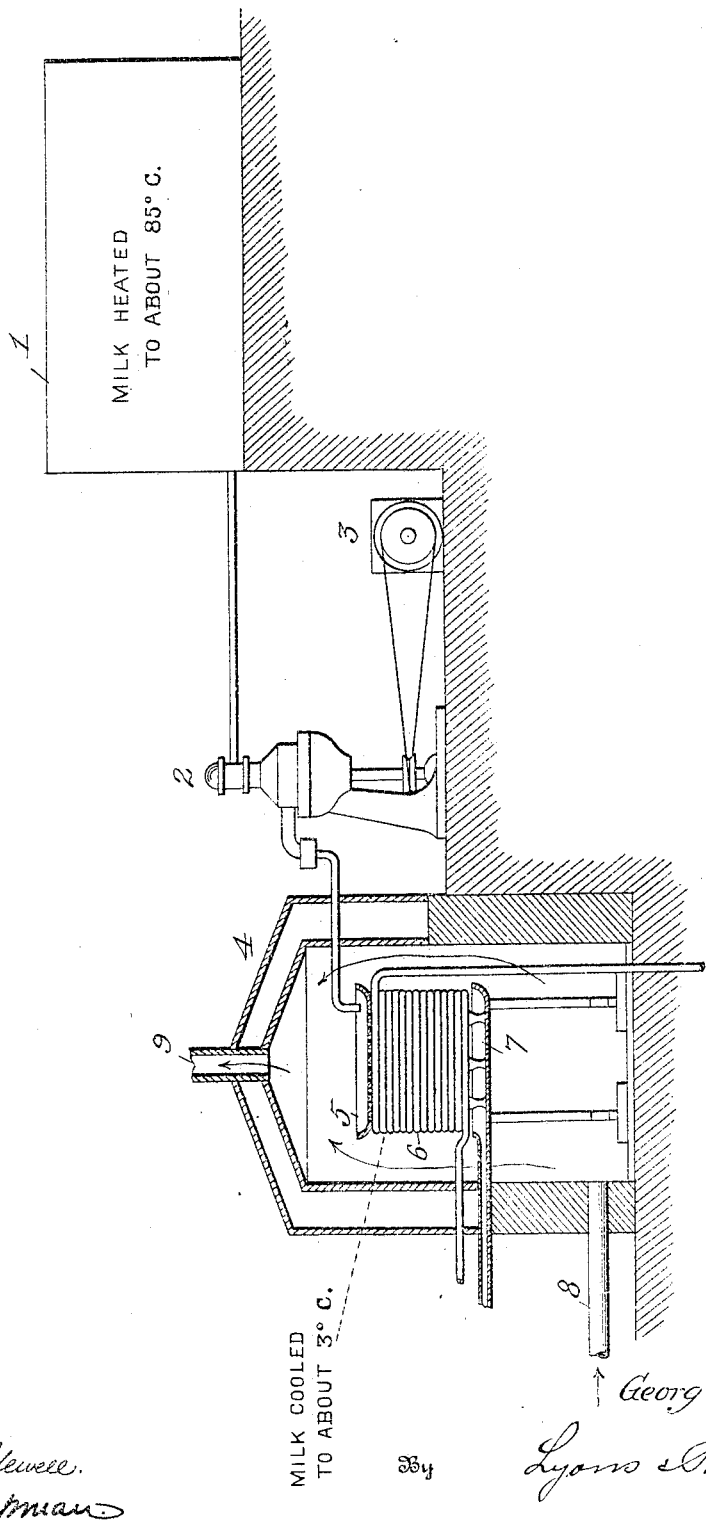

UNITED STATES PATENT OFFICE.

GEORG DASEKING, OF HANOVER, GERMANY, ASSIGNOR, BY MESNE ASSIGNMENTS, TO JOS. BERLINER, OF HANOVER, GERMANY.

PROCESS OF REFINING MILK.

No. 801,773.     Specification of Letters Patent.     Patented Oct. 10, 1905.

Application filed May 14, 1903. Serial No. 157,138.

*To all whom it may concern:*

Be it known that I, GEORG DASEKING, a subject of the Emperor of Germany, residing at Hanover, in the Province of Hanover and Kingdom of Prussia, Germany, (whose post-office address is No. 11 Sallstrasse, Hanover,) have invented new and useful Improvements in Processes of Refining Milk, of which the following is a specification.

This invention relates to a process of refining milk by destroying the germs of bacteria contained in the milk as it comes from the cow and by removing from the milk all noxious matter without otherwise altering the milk, so that it will retain all elements of nutrition. The result of the process, then, is a milk that has the peculiar taste of fresh milk as it is primarily obtained, but is free of all harmful matter and can be preserved a long time without deterioration.

My process consists in heating the milk as originally obtained to a temperature that is sufficient to destroy the germs or bacteria and to maintain the milk at that high temperature for a certain time, and then while still at that high temperature passing it through a centrifugal apparatus, by which all impurities are removed, and then quickly cooling the milk to a temperature approaching, but not quite reaching, the freezing-point of water, and this cooling is effected while the milk is being aired or ventilated, so as to drive from the same foul or obnoxious vapors.

Milk as it is originally obtained contains various germs of disease and of fermentation, and it also contains particles of mucus and a quantity of free casein. In accordance with my process the milk, as above stated, is first heated to a temperature high enough to destroy the germs of disease and of fermentation which it contains. At that temperature the particles of mucus are more or less coagulated and they form minute nuclei, about which the particles of free casein assemble. When this part of the process has been completed and the milk, while still hot, is passed through a centrifugal machine, the groups of mucus, with the adhering casein, are separated from the milk, while no separation of the cream takes place. In this manner the milk retains all its elements of nutrition, but has all noxious matter destroyed or removed. Some germs of fermentation may, however, have escaped destruction by heat, and it is now imperative to cool the milk as rapidly as possible in order that fermentation be avoided, and in accordance with my process the milk is now rapidly cooled to a temperature of about 3° centigrade, thereby destroying such remaining germs as are susceptible to cold, and while thus cooling the milk is being aired, fanned, or ventilated, so as to drive from the same foul or obnoxious vapors.

Concisely stated, my process is practiced as follows: The milk as taken from the cow is heated in a water-bath to about 85° centigrade and is maintained at this high temperature for a period of between ten and twenty minutes. While at this high temperature the milk is passed through a centrifugal apparatus, whereby all impurities are separated therefrom, and the final step in the process consists in cooling the milk rapidly and at the same time airing or ventilating the same.

While I have herein set forth my understanding of the effect of each single step of my process of refining milk, my invention is not dependent upon the accuracy of my understanding of these matters, but upon the fact that my process as a whole is productive of an improved milk that is free of noxious matter, is pure to the taste, and contains all the nutritive elements of fresh milk.

The figure of drawing is a diagrammatic representation of an apparatus by means of which my invention may be carried out.

The milk is heated in a chamber or vat 1 to a temperature of about 85° centigrade and is maintained at that temperature for from ten to twenty minutes. The hot milk is then conducted to a centrifugal machine 2, (which may be driven by a motor 3,) where the impurities are removed. After passing through the centrifugal machine the purified milk is conducted into a compartment 4 and is there discharged into a perforated trough 5, from whence it falls in a shower over a series of pipes 6, kept at such temperature that the milk is cooled to about 3° centigrade. The cooled milk falls into another trough 7, from whence it may be conveyed into suitable containers for transportation or sale. While the milk is falling over the pipes 6 a current of air is made to circulate through the compartment 4, entering through the flue 8, near the bottom of the compartment, and flowing out through the top of the compartment by way of the flue 9, so that the milk while being cooled is subjected to a continuous air-current and is thereby thoroughly aired.

What I claim as my invention, and desire to secure by Letters Patent, is—

1. The process of refining milk, which consists in subjecting the same to a comparatively high temperature, maintaining the milk at the elevated temperature for a period of time, separating the heated milk from the impurities, and then ventilating and quickly cooling the milk to a comparatively low temperature, substantially as described.

2. The process of refining milk, which consists in heating the milk to a temperature of about 85° centigrade, maintaining the milk at this temperature for a period of about twenty minutes, then subjecting the same, while still hot, to a centrifugal separating process, and then ventilating and rapidly cooling the milk to a temperature of about 3° centigrade, substantially as described.

GEORG DASEKING.

Witnesses:
C. C. STEVENSON,
LEONORE RASCH.